US009637129B2

(12) United States Patent
Pallett

(10) Patent No.: US 9,637,129 B2
(45) Date of Patent: May 2, 2017

(54) DRIVER TRAINING INTERFACE

(71) Applicant: Ford Global Technologies, LLC, Dearborn, MI (US)

(72) Inventor: Tobias John Pallett, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/832,407

(22) Filed: Aug. 21, 2015

(65) Prior Publication Data

US 2015/0353093 A1      Dec. 10, 2015

Related U.S. Application Data

(63) Continuation-in-part of application No. 13/541,581, filed on Jul. 3, 2012, now abandoned.

(51) Int. Cl.
| | |
|---|---|
| *B60W 30/18* | (2012.01) |
| *G09B 19/16* | (2006.01) |
| *F02D 13/04* | (2006.01) |
| *B60W 10/18* | (2012.01) |
| *B60W 10/06* | (2006.01) |
| *G07C 5/08* | (2006.01) |
| *B60R 16/023* | (2006.01) |
| *B60T 7/06* | (2006.01) |
| *G05G 1/34* | (2008.04) |

(52) U.S. Cl.
CPC ..... *B60W 30/18136* (2013.01); *B60R 16/023* (2013.01); *B60T 7/06* (2013.01); *B60W 10/06* (2013.01); *B60W 10/18* (2013.01); *F02D 13/04* (2013.01); *G05G 1/34* (2013.01); *G07C 5/0808* (2013.01); *G09B 19/167* (2013.01)

(58) Field of Classification Search
CPC .................... B60W 30/18136; B60W 30/1816
See application file for complete search history.

(56) References Cited

U.S. PATENT DOCUMENTS

| | | | |
|---|---|---|---|
| 3,202,829 A | 8/1965 | Kawahara | |
| 3,477,310 A * | 11/1969 | Garcia | ..................... G05G 1/34 |
| | | | 180/322 |
| 3,590,265 A | 6/1971 | Richardson | |
| 3,795,990 A | 3/1974 | Quicker, Jr. | |
| 4,312,246 A | 1/1982 | Barresi | |
| 4,425,097 A | 1/1984 | Owens | |
| 5,105,923 A | 4/1992 | Iizuka | |
| 5,964,122 A | 10/1999 | Bonnard et al. | |
| 6,039,410 A | 3/2000 | Robertson et al. | |
| 6,297,646 B1 | 10/2001 | Lang et al. | |
| 6,435,055 B1 | 8/2002 | Sato | |
| 7,099,751 B2 | 8/2006 | DePrez et al. | |
| 7,142,963 B2 | 11/2006 | Borroni-Bird et al. | |

(Continued)

*Primary Examiner* — Thomas Tarcza
*Assistant Examiner* — Michael Berns
(74) *Attorney, Agent, or Firm* — Julia Voutyras; McCoy Russell LLP

(57) ABSTRACT

A driver training vehicle system includes a driver training vehicle and an interface system with an auxiliary control unit that is removably installable in the vehicle. A vehicle control system can receive a brake input from a vehicle driver via a floor pedal in the vehicle as well as a brake input from a vehicle passenger via the auxiliary unit. The control system adjusts an engine torque and a brake torque based on the received brake inputs to decelerate the vehicle.

17 Claims, 5 Drawing Sheets

(56) References Cited

U.S. PATENT DOCUMENTS

| | | |
|---|---|---|
| 7,672,770 B2 | 3/2010 | Inoue et al. |
| 8,100,217 B2 | 1/2012 | Crombez |
| 8,169,311 B1 | 5/2012 | Breed |
| 8,942,889 B2 * | 1/2015 | Crombez ............... B60K 26/02 180/197 |
| 2003/0127261 A1 | 7/2003 | Borroni-Bird et al. |
| 2010/0152989 A1 | 6/2010 | Smith et al. |
| 2010/0313693 A1 | 12/2010 | Crombez |
| 2011/0160962 A1 | 6/2011 | Crombez |
| 2012/0245765 A1 | 9/2012 | Medwin et al. |
| 2012/0283894 A1 | 11/2012 | Naboulsi |

* cited by examiner

US 9,637,129 B2

DRIVER TRAINING INTERFACE

CROSS REFERENCE TO RELATED APPLICATIONS

The present application is a continuation-in-part of U.S. patent application Ser. No. 13/541,581, entitled "AUXILIARY VEHICLE CONTROL," filed on Jul. 3, 2012, the entire contents of which are hereby incorporated by reference for all purposes.

TECHNICAL FIELD

This application relates to a driver-training device and interface for use in a driver training vehicle operated by a student-driver and an instructor-passenger.

BACKGROUND AND SUMMARY

Educational driving cars or driver training vehicles in which a driving instructor passenger teaches a student-driver to drive include various devices that enable the instructor to override the student-driver's operation and prevent accidents. The devices typically include mechanical devices that enable dual operation of vehicle operating systems, such as braking systems and clutch systems. In addition, driver training vehicles may include a driver interaction interface which allows a student driver to interact with the vehicle controls different from an instructor-passenger. Such in-vehicle driver assistance configurations are intended to supplement the knowledge obtained from driving handbooks or manuals and prepare student drivers for driving tests (such as tests to obtain a driver's license or learner's permit).

One example of such a device is shown by Sato in U.S. Pat. No. 6,435,055. Therein, a braking stick is mechanically coupled to the vehicle's brake pedal so that the instructor-passenger can override the student-driver's interaction with the brake pedal and effect a braking operation. Another example device is shown by Bonnard et al. in U.S. Pat. No. 5,964,122. Therein, a mechanical sensor responds to a foot action of the instructor-passenger by relaying an electronic signal to a mechanical element, the element effecting a braking, clutch engaging, and/or accelerating operation that overrides the braking action of the student-driver.

However the inventors herein have identified potential issues with such devices. As one example, the devices enable the braking action of the student-driver to be over-ridden but do not enable the accelerating action of the student-driver to be over-ridden. Consequently, the instructor has to apply a brake effort to overcome the student's accelerator pedal input. As such, this can add significantly to the time required to bring the vehicle to a stop. As another example, since the devices operate using mechanical components, substantial modifications to the vehicle are required to incorporate the largely mechanical devices in the vehicle. This not only changes the physical appearance of the vehicle, but also reduces portability of the device from one vehicle to another. In addition, the modifications can be expensive, adding to the cost of the driver training vehicle.

In one example, some of the above issues may be addressed by a vehicle interface system (configured, for example, as an auxiliary unit for a vehicle) comprising a user input device for receiving a braking request from a vehicle passenger and a transducer coupled to the user input device that generates an output based on the braking request. The auxiliary unit of the vehicle interface system further includes a controller with software logic for receiving the transducer output and generating one or more vehicle powertrain commands based on the braking request and relaying the one or more vehicle powertrain commands to a vehicle control system. In this way, a simpler and more cost-effective device is provided for driver training vehicles.

For example, any vehicle may be used as a driver training vehicle by removably installing a vehicle interface system, configured as an auxiliary unit, in a cabin space of the vehicle. The auxiliary unit may include a removably installable user input device, such as a pedal or a button, via which a vehicle passenger, such as a driving instructor, may provide a braking request. As such, the auxiliary unit pedal may be distinct from a brake pedal and an accelerator pedal fixedly installed in the vehicle cabin via which a vehicle operator, such as a student driver, may provide a torque request. A control system of the vehicle may receive a torque request from the student driver via the brake pedal and/or accelerator pedal and adjust engine operations accordingly to provide the desired torque. During situations when a student driver is not able to appropriately respond to an imminent vehicle collision (e.g., the driver does not apply the brake pedal fast enough or the driver mistakenly applies the accelerator pedal), the driving instructor may be able to intervene and control the vehicle by actuating the user input device. Upon establishing communication with the vehicle control system via a transducer, a controller of the auxiliary unit may relay the passenger's braking request to the vehicle control system, responsive to which the vehicle control system may adjust a torque output (e.g., an engine torque output and a braking torque output) by relaying appropriate commands to an engine control module and a brake control module of the vehicle. In particular, when both the student driver and the instructor passenger provide torque requests, the vehicle control system may be able to ignore and override the torque request of the student driver and increase a braking effort on the vehicle responsive to the torque request of the instructor received via the auxiliary unit. The system thereby allows for improved driver training assistance. In this way, a system with reduced mechanical complexity and modifications, yet cost-effective, may be provided for use in a driver training vehicle to enable improved driver training. By communicatively coupling the auxiliary device to the existing control system of the vehicle, the vehicle's existing engine control modules (e.g., speed control module, brake control module, etc.) can be advantageously used by a driving instructor to override a student-driver's input, including an accelerator pedal input, and control the vehicle. In addition, use of the auxiliary device allows for an improved driver assistance configuration. By reducing the reliance on mechanically coupled components, portability of the device is improved, allowing the same device to be used on different driver training vehicles. Overall, safety in an educational vehicle used to teach driving can be improved while lowering costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
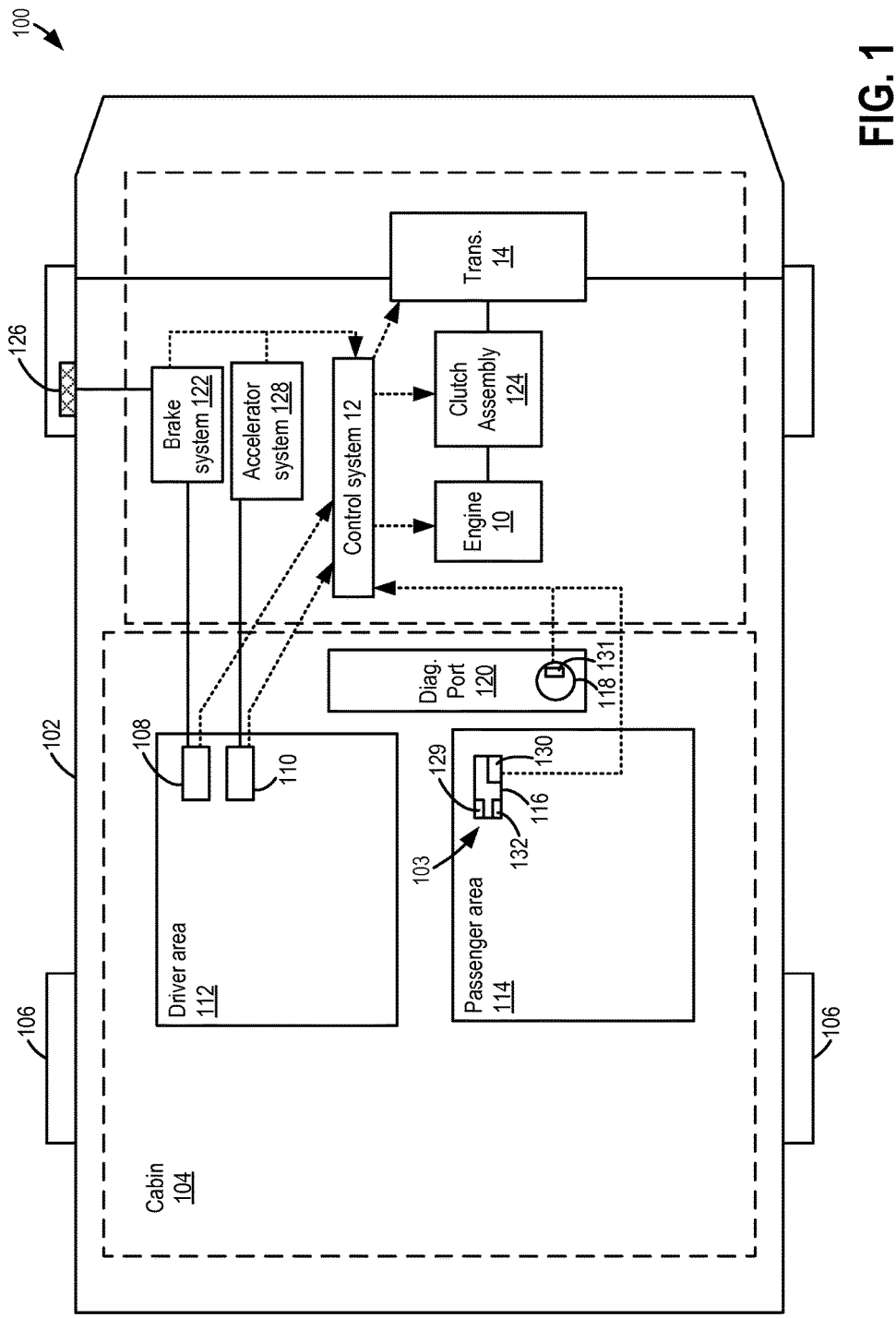
FIGS. 1-2 show example embodiments of a vehicle system including a driver training vehicle operable by a student-driver and an instructor-passenger, and an auxiliary unit removably installable in the vehicle.
Figure 2:
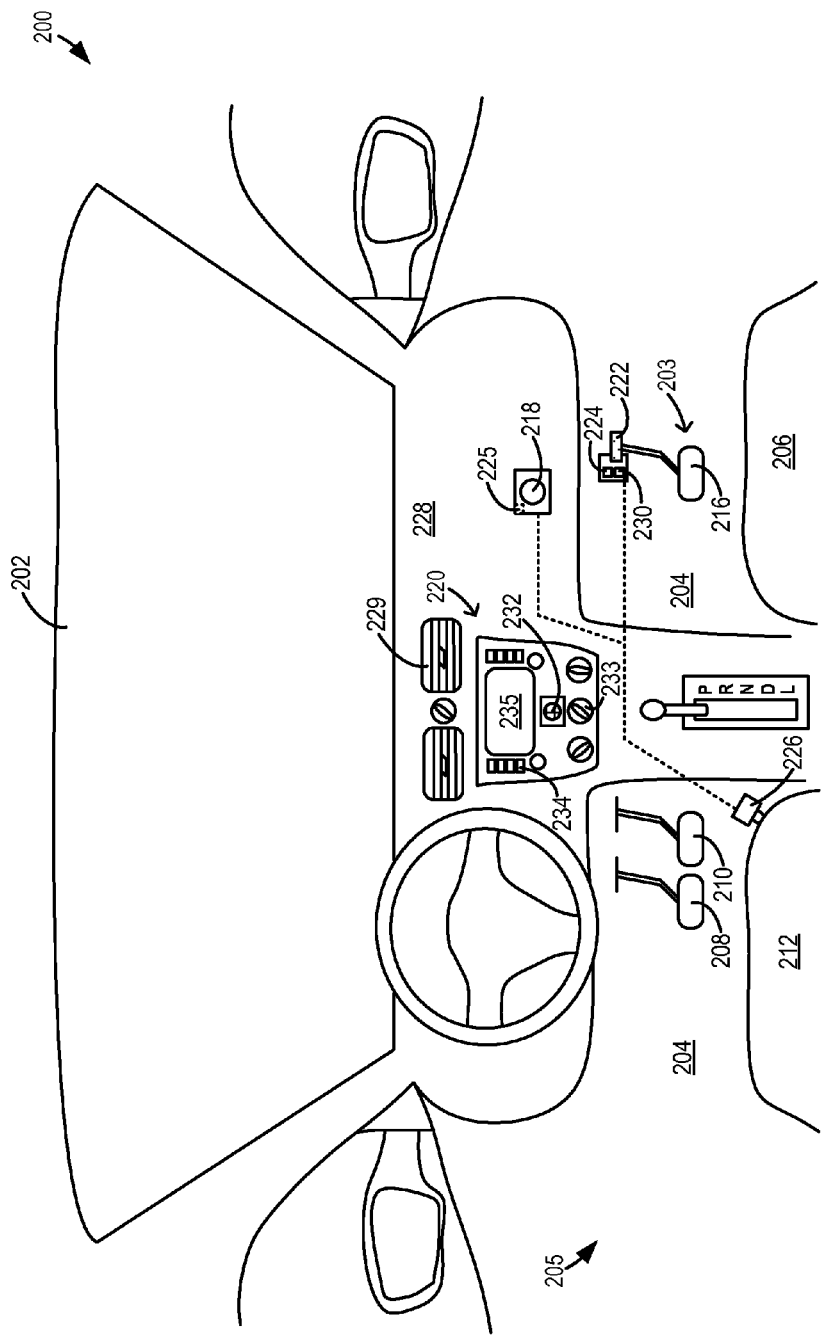

A vehicle interface system is provided for improving passenger safety in a driver training vehicle. The vehicle interface system, as shown in FIGS. 1-2, includes a vehicle wherein an auxiliary unit can be removably installed. A vehicle control system coupled in the vehicle may receive a brake request from a student vehicle operator via a floor pedal. When installed in the vehicle, the auxiliary unit may be communicatively coupled to the vehicle control system and may relay a brake request from an instructor vehicle passenger to the vehicle control system, using a control routine such as the example of FIG. 4. The vehicle control system may be configured to perform a control routine, such as the example routine of FIG. 3, to generate one or more commands to decelerate the vehicle responsive to the brake request(s) from the vehicle operator and/or vehicle passenger. By adjusting a brake torque and engine torque based on a vehicle operator brake input received via the floor pedal and a vehicle passenger brake input received via the user input device, a desired vehicle deceleration may be provided. Example deceleration operations are shown at FIG. 5. By using a portable auxiliary unit, a student driver may be taught to drive on any vehicle without requiring substantial mechanical modifications to the vehicle.

FIG. 1 shows a vehicle system 100 including a vehicle 102 and an auxiliary unit 103 that is couplable to the vehicle. For example, as shown with reference to FIG. 2, the auxiliary unit 103 may be mounted to or installed inside vehicle 102. In one example, the vehicle is a driver training vehicle wherein a student driver is taught to drive the vehicle by a driving instructor seated next to the student driver in a passenger seat of the vehicle. Vehicle 102 includes a cabin 104. The vehicle further includes a brake pedal 108 and an accelerator pedal 110 for receiving a request from a vehicle operator. The brake pedal 108 and the accelerator pedal 110 are fixedly installed in a driver area 112 of cabin 104.

Brake pedal 108 may be mechanically coupled to a brake system 122 of the vehicle which includes wheel brakes 126 for braking vehicle wheels 106. In addition, brake pedal 108 may be electronically coupled to a brake control module of vehicle control system 12 to enable drive-by-wire braking. In particular, brake pedal 108 may be coupled to a powertrain system of the vehicle, the powertrain system including at least powertrain components engine 10 and transmission 14 coupled via clutch assembly 124, via vehicle control system 12. In response to a vehicle operator applying brake pedal 108, the vehicle control system may increase a vehicle braking effort by increasing the wheel brake torque, increasing an engine brake torque and/or reducing an engine power. For example, in addition to applying the wheel brakes, the vehicle control system may make adjustments to a throttle position, fuel injection (amount, timing, etc.), and/or spark timing to increase the braking effort. The vehicle control system 12 may also decrease a torque output from engine 10 and an engine torque transferred to vehicle wheels 106 via clutch assembly 124 and transmission 14.

The vehicle control system 12 may also use the drive-by-wire braking to make braking adjustments when no vehicle operator brake pedal input is received as well as while ignoring a vehicle operator accelerator pedal (or brake pedal) input. For example, braking adjustments that are independent of the vehicle operator's pedal (brake or accelerator pedal) input may be performed in response to vehicle stability needs (e.g., traction needs, such as when driving on a slippery road, curved road, rainy conditions, snow conditions, etc.) and engine protection needs (e.g., to reduce abnormal combustion events such as knocking and pre-ignition).

Various drive-by-wire braking features may be included in the brake control module of vehicle control system 12. For example, Adaptive Cruise Control (ACC), Collision Mitigation by Braking (CMbB) and City Safety Stop features may be included for braking the vehicle to reduce imminent collisions independent of a vehicle operator's input. These features may enable vehicle control system 12 to adjust a torque output so as to control a vehicle speed based on vehicle operating conditions (e.g., traffic conditions, weather conditions, road conditions, etc.) as determined based on one or more on-board and off-board sensors. As an example, the Adaptive Cruise Control (ACC) feature may allow a desired vehicle speed to be maintained by accelerating on uphill segments and decelerating on downhill segments, without requiring the vehicle operator to apply the accelerator pedal on the uphill segments or apply the brake pedal on the downhill segments. As another example, the Collision Mitigation by Braking (CMbB) and City Safety Stop features may detect an imminent collision and reduce vehicle collisions by applying partial or full braking efforts to minimize vehicle impact irrespective of whether the vehicle operator has applied the brake pedal or not.

Accelerator pedal 110 may be similarly coupled to a powertrain system of the vehicle, including being coupled to brake system 122, a clutch system including a clutch assembly 124, and an accelerator system 128 of the vehicle. The coupling allows the vehicle control system 12 to decrease a brake torque applied to the wheels and increase an engine torque in response to the accelerator pedal 110 being applied. In one example, the accelerator pedal 110 may be mechanically coupled to accelerator system 128 although in other embodiments, the accelerator pedal may be electronically coupled to the accelerator system. Additionally, or optionally, accelerator pedal 110 may be electronically coupled to an engine control module and the brake control module of vehicle control system 12 to enable drive-by-wire accelerating. Therein, in response to a vehicle operator applying accelerator pedal 110, the vehicle control system may decrease a vehicle braking effort by decreasing the wheel brake torque and an engine brake torque while increasing an engine power output. For example, the vehicle control system may make adjustments to a throttle position, fuel injection (amount, timing, etc.), and/or spark timing to decrease the braking effort and increase the output from engine 10 and transmission 14 to wheels 106.

The vehicle control system may also use the drive-by-wire system to make acceleration adjustments when no vehicle operator brake pedal input is received as well as to making acceleration adjustments while ignoring the vehicle operator's accelerator pedal input. For example, accelerating adjustments that are independent of the vehicle operator's pedal input may be performed in response to vehicle speed requirements (e.g., during cruise control to maintain a desired vehicle speed).

Vehicle 102 further includes a diagnostics port 120 inside vehicle cabin 104. Diagnostics port 120 may be located, for example, on a wall of the vehicle cabin, on a dashboard of the vehicle cabin, under the vehicle operator's seat, etc. Diagnostics port 120 may be a digital communication port that is configured to relay a standardized series of diagnostic trouble codes (DTCs) that enable the rapid identification and mitigation of vehicle malfunctions. For example, vehicle control system 12 may periodically perform various on-board diagnostic routines to verify the functionality of various vehicle components. If a diagnostic routine leads to a "failed" result, an appropriate diagnostic code may be generated and retrieved via the diagnostics port. A vehicle mechanic, for example, may be able to connect to the diagnostic port to retrieve a list of diagnostic codes that were generated during vehicle operation, and perform vehicle maintenance operations accordingly.

In addition, diagnostics port 120 may communicate with auxiliary unit 103. In particular, as elaborated below, the diagnostics port may communicate with a transducer 129 of the auxiliary unit 103. In one example, the diagnostics port may communicate with transducer 129 via wireless communication. However, other forms of communicative coupling may also be possible. A brake torque request may be generated by a vehicle passenger upon actuation of a user input device of the auxiliary unit 103. In response to the brake torque request, the transducer 129 may generate an output and relay the output to the diagnostics port 120. The diagnostics port may be communicatively coupled to vehicle control system 12 so that the brake torque request received at the diagnostics port can be further relayed to the vehicle control system 12. The control system may then generate various commands (e.g., powertrain commands) based on the received torque request to adjust a braking effort based on the received brake request. Vehicle control system 12 may be configured as a microcomputer, including a microprocessor unit, input/output ports, an electronic storage medium (e.g., a read-only memory chip) for executable programs and calibration values, random access memory, keep alive memory, and a data bus. Vehicle control system 12 may receive various signals from on-board and off-board vehicle sensors. These may include, for example, various sensors coupled to engine 10, transmission 14, accelerator pedal 110, brake pedal 108, clutch assembly 124, etc. In addition to those signals, vehicle control system 12 may be programmed with computer readable data representing instructions executable by a processor of the control system for performing the methods described herein as well as other variants that are anticipated but not specifically listed. These may include instructions for receiving a torque request from a vehicle operator (via actuation of the brake and/or accelerator pedals) and a torque request from a vehicle passenger (via actuation of one or more auxiliary unit user input devices). The vehicle control system may further include instructions for generating various powertrain commands responsive to the received torque requests and for adjusting vehicle and engine operation based on the generated powertrain commands. An example routine performed by vehicle control system 12 is elaborated herein at FIG. 4.

Now turning to auxiliary unit 103, it may be a portable device that can be removably installed in a vehicle, such as vehicle 102, for using the vehicle as a driver training vehicle. In one example, vehicle 102 can be operated as a conventional vehicle when auxiliary unit 103 is not installed therein and then operated as a driver training vehicle when auxiliary unit 103 is installed therein. The portability of auxiliary unit 103 allows any vehicle to be used as a driver training vehicle without the need for extensive and costly mechanical modifications to the vehicle, while enabling vehicle safety, in particular, during imminent vehicle collisions.

Auxiliary unit 103 includes one or more user input devices for receiving a braking request from a vehicle passenger. The one or more user input devices may be located within a passenger area 114 of vehicle cabin 104. In the depicted embodiment, auxiliary unit 103 includes a first user input device 116 and a second user input device 118. However, in alternate embodiments, fewer or more user input devices may be possible. The one or more user input devices may include, as non-limiting examples, a pedal that is removably couplable to a floor of the vehicle cabin, a switch (or other on/off device) that is removably installable to a wall or dashboard of the vehicle cabin, a push-actuated button that is removably installable to the wall or dashboard of the vehicle cabin, a switch (e.g., an emergency switch) that is removably installable to the wall or dashboard of the vehicle, etc. In the example depicted at FIG. 2, the first user input device is a floor pedal that is removably coupled to a floor of the vehicle cabin in a passenger area while the second user input device is a button (herein, a push-actuated "panic" button) that is removably installed to a wall (herein, the dashboard) of vehicle cabin 104. The auxiliary unit 103 may also include a fastener for removably coupling the one or more user input devices to the vehicle cabin. As a non-limiting example, the auxiliary unit may include a VELCRO® fastener for fastening pedal 116 to a floor of vehicle cabin 104.

As previously discussed, auxiliary unit 103 includes a transducer coupled to each of the user input devices 116, 118. For example, the auxiliary unit may include a first transducer 129 coupled to the first user input device 116 and a second transducer 131 coupled to the second user input device 118. Transducers 129, 131 generate an output based on the braking request received from the vehicle passenger via the one or more user input devices. Each transducer 129, 131 then relays the output generated in response to the braking request to a controller 130 of the auxiliary unit. In one example, the transducers 129, 131 may relay the output to the controller 130 via wireless communication, although other forms of communicative coupling are also possible.

Controller 130 of auxiliary unit 103 may be configured as a microcomputer, including a microprocessor unit, input/output ports, an electronic storage medium (e.g., a read-only memory chip) for executable programs and calibration values, random access memory, keep alive memory, and a data bus. Controller 130 may include software logic for receiving signals from the transducer 129 and for generating one or more signals for relaying to the vehicle control system 12 based on the input received from the transducer. For example, the controller 130 may include software logic for receiving the transducer output (which is based on the braking request received from the vehicle passenger via the user input devices) and generating one or more vehicle powertrain commands based on the passenger's braking request. The controller 130 may further relay the generated one or more powertrain commands to the vehicle control system 12. In one example, controller 130 may be communicatively coupled to vehicle control system 12 via wireless communication, although other forms of communicative coupling may be possible.

The software logic in the controller 130 of the auxiliary unit 103 may include, as an example, handshake logic for establishing and confirming communication between the transducer 129 and the vehicle control system 12. In some embodiments, the handshake logic may include relaying of messages/signals between the auxiliary unit 103 and vehicle control system 12 to provide positive feedback from the auxiliary unit indicating that the auxiliary unit is properly connected (e.g., communicatively connected) to the vehicle control system 12 and available to provide passenger input. Likewise, the handshake logic may further include relaying of messages to receive positive feedback from the vehicle control system indicating that the vehicle control system is available to receive the passenger input. In some embodiments, auxiliary unit 103 may comprise a feedback indicator 132 for indicating communicative coupling of the transducer 129 with vehicle control system 12. For example, based on successful handshaking between the controller 130 and the vehicle control system 12, the feedback indicator 132 may illuminate a lamp to indicate that successful and secure communicative coupling of the transducer 129 with the vehicle control system 12 has been established.

In addition to the mentioned signals and commands, controller may be programmed with computer readable data representing instructions executable by a processor of the controller 130 for performing the methods described herein as well as other variants that are anticipated but not specifically listed. An example routine performed by controller 130 is elaborated herein at FIG. 5.

It will be appreciated that while the depicted example illustrates controller 130 physically coupled within first user input device 116 and transducer 131 of the second user input device 118 communicatively coupled to controller 130, in alternate embodiments, controller 130 may be physically coupled within second user input device 118 and transducer 129 of the first user input device 116 may be communicatively coupled to controller 130.

Controller 130 may generate one or more vehicle powertrain commands based on a braking request received via the transducer 129. In one example, the braking requests received from the various user input devices may be perceived as different and distinct inputs and accordingly different commands may be generated responsive to the different inputs. For example, in response to a first braking request received from first input device 116, controller 130 may generate and relay a first powertrain command to the vehicle control system 12, while in response to a second braking request received from second input device 118, controller 130 may generate and relay a second, different powertrain command to vehicle control system 12. In one example, the first braking request received from the first user input device may request the vehicle to be decelerated at a first rate while the second braking request received from the second user input device may request the vehicle to be decelerated at a second, different rate. For example, where the first user input device is a floor pedal and the second user input device is a dashboard button, actuation of the floor pedal by the passenger may be perceived as a first deceleration input that is translated into a first set of powertrain commands that decelerate the vehicle at a first, slower rate while actuation of the dashboard button by the passenger may be perceived as a second deceleration input that is translated into a second set of powertrain commands that decelerate the vehicle at a second, faster rate. In one example, actuation of the button by a vehicle passenger may be translated into a request for maximum braking torque and minimum engine torque so as to bring the vehicle to a substantially immediate stop. This may be similar to an Active city stop event requested by a vehicle operator by actuation of a single switch input in an active city stop feature (drive-by-wire feature) of the vehicle. In an alternate example, based on the input received from a given user input device, powertrain commands may be generated that provide the ability to modulate the torque reduction so that there is less intrusive (or less perceived) mitigation from the vehicle passenger.

It will be appreciated that the user input devices may be configured as on/off devices wherein the actuation of the user input device provides a maximal braking torque. Alternatively, the user input devices may be configured as controlled devices wherein the amount of braking torque applied (or degree of deceleration provided) is modulated based on a degree of actuation of the user input device. For example, when the passenger stomps the pedal to the floor (that is, fully depresses the pedal) or actuates a panic button, maximum braking torque and maximum deceleration may be provided. In comparison, when the pedal is slightly depressed, a corresponding degree of braking torque and deceleration may be provided. This enables the passenger to have a refined override capability.

It will be appreciated that in still further embodiments, the braking requests received from the various user input devices may be perceived as similar inputs and accordingly the same commands may be generated responsive to the inputs. For example, the same set of powertrain commands may be generated by controller 130 responsive to the vehicle passenger actuating a floor pedal or actuating a button. However, the powertrain commands generated may vary based on the number of user input devices actuated. For example, the controller 130 may generate a first set of powertrain commands that decelerate the vehicle at a first, slower rate if any one of the user input devices is actuated while generating a second set of powertrain commands that decelerate the vehicle at a second, faster rate as more than one user input device is actuated.

As such, the one or more user input devices 116, 118 may not be mechanically coupled to vehicle powertrain components, including the brake system 122, clutch system and clutch assembly 124, and/or accelerator system 128 of the vehicle 102. Rather, each of the first and second user input devices 116, 118 of the auxiliary unit 103 may be electronically coupled to the vehicle control system 12 via the controller 130. Thus, when installed, auxiliary unit 103 is electronically coupled to vehicle control system 12. This allows the drive-by-wire features of the vehicle control system 12 to be leveraged to provide braking when the passenger requests braking. Specifically, a vehicle passenger may relay a torque request (such as a braking request provided by a driving instructor in response to an imminent collision) via the user input device of the auxiliary unit, and the vehicle control system may advantageously use braking adjustments of the brake control module and engine control module to provide a braking torque independent of the vehicle operator's torque request. This allows a driving instructor to apply a brake effort and prevent an imminent collision if a student driver does not apply the brake pedal fast enough. Further, the driving instructor may be able to apply a brake effort and overcome the student driver's accelerator pedal input to overcome a collision.

For example, in response to a vehicle operator (e.g., student driver) requesting braking by depressing the brake pedal, the vehicle control system may increase a vehicle braking effort by increasing the wheel brake torque and/or by increasing the engine brake torque. In response to a vehicle passenger (e.g., passenger instructor) requesting braking via the input devices of the auxiliary unit, the vehicle control system may increase a vehicle braking effort by increasing engine brake torque, such as via increased compression braking. In addition, the vehicle control system may make adjustments to a throttle position, fuel injection (amount, timing, etc.), and/or spark timing to increase the engine brake torque output.

As another example, in response to a braking request from a vehicle operator via the brake pedal, the vehicle control system may generate a wheel brake torque command. In comparison, in response to a braking request from a vehicle passenger via the auxiliary unit, the vehicle control system may generate an engine brake torque command (e.g., compression braking and/or regenerating braking).

FIG. 2 depicts an example embodiment of a vehicle system wherein driver training vehicle 202 is fitted with an auxiliary unit 203 having multiple user input devices. In particular, FIG. 2 depicts a view 200 of the vehicle system from within vehicle 202. In the depicted example, the multiple user input devices of auxiliary unit 203 include a first removable pedal 216 and a second removable button 218. The first removable pedal 216 is coupled in the passenger area of the vehicle cabin 205, in particular, on a floor 204 of the cabin in front of a passenger seat 206. As such, removable pedal 216 may be distinct from a brake pedal 208 and accelerator pedal 210 of the vehicle that are immovably coupled in the driver area of the vehicle cabin, specifically, on the floor 204 of the cabin in front of a driver seat 212. A student driver may be seated in the driver seat 212 while a driving instructor may be seated in the passenger seat 206.

The student driver may adjust vehicle operations by applying the accelerator pedal 210 and/or the brake pedal 208. Responsive to the driver's pedal input, a control system 220 of the vehicle may adjust a braking torque and an engine torque that is output and relayed to the vehicle wheels. In addition, the driving instructor may be able to control the vehicle by actuating removable floor pedal 216 and/or removable panic button 218.

Removable floor pedal 216 is shown removably attached to the floor 204 of the vehicle in the passenger area of the vehicle cabin via fastener 222, herein depicted as a VEL-CRO® fastener. However, in alternate embodiments, the fastener used to couple the removable pedal of the auxiliary unit to the floor of the cabin may include any number of known technologies used to secure carpet mats in place (e.g. heavy base plate and/or "bed of nails" button). Additionally one could have a hard connection back to the seat rail bolts. Removable floor pedal 216 may be coupled to a (dedicated) transducer 224 configured to respond to the braking request received upon actuation of the floor pedal 216 by generating an output.

Vehicle passenger may additionally, or optionally, provide a braking request by actuating (e.g., pushing) a removable button 218 on vehicle dashboard 228. As depicted, vehicle dashboard may include various other vehicle features such as air vents 229, control knobs 233, control buttons 234, switches (such as switch 232), interactive display panel 235, etc. In the present example, removable button 218 may be configured as a "panic button" wherein actuation of the button indicates a request for an immediate vehicle stop. As such, removable button 218, which is actuatable by the passenger in passenger seat 206 may be distinct from an active stop button or switch 232, immovably fixed on dashboard 228, which is actuatable by the vehicle driver in driver seat 212 to request an immediate vehicle stop. Removable button 218 may be attached to dashboard 228 via a dedicated fastener, for example, a VELCRO® fastener, although other types of fasteners may be possible. Removable button 218 may be coupled to a (dedicated) transducer 225 configured to respond to the braking request received upon actuation of button 218 by generating an output. Alternatively, removable button 218 may be communicatively coupled to transducer 224 positioned at floor pedal 216 so that an output is generated at transducer 224 upon actuation of removable button 218.

In one example, the driving instructor seated at passenger seat 206 may apply floor pedal 216 and/or press button 218 to request vehicle braking. In response to the driving instructor applying floor pedal 216, transducer 224 may receive the passenger braking request and generate an output. Likewise, in response to the driving instructor actuating button 218, transducer 225 or transducer 224 may receive the passenger braking request and generate an output. The transducer outputs are received by controller 230 of auxiliary unit 203 (shown coupled to floor pedal 216) and used to generate a corresponding set of commands (such as a set of powertrain command). The generated set of commands are then relayed by controller 230 to a diagnostics port 226 of vehicle 202, for example, via wireless communication. In the depicted example, the diagnostics port is located under the driver seat 212. Diagnostics port 226 may be communicatively coupled to vehicle control system 220 so that the received command can be further relayed to vehicle control system 220. Based on the commands received, vehicle control system may adjust operation of powertrain components to provide a desired braking effort. For example, in response to the deceleration inputs received from the user input devices of the auxiliary unit 203, the vehicle control system may adjust a braking torque and/or an engine torque applied to the vehicle wheels.

In one example, the driving instructor seated at passenger seat 206 may apply floor pedal 216 to request vehicle braking while the student driver seated in driver seat 212 applies accelerator pedal 210. In response to the passenger braking request received via the controller 230, the vehicle control system 220 may override the driver acceleration request. Specifically, the vehicle control system may advantageously leverage the drive-by-wire features of the vehicle to ignore the acceleration request provided by the driver and instead operate the various powertrain components responsive to the braking request provided by the passenger by actuating removable pedal 216. For example, a brake control module of the vehicle control system 220 may enable fuel injection adjustments, throttle position adjustments, spark timing adjustments, transmission gear adjustments, etc., to be made so as to increase a braking torque applied to the vehicle wheels while reducing an engine torque. This allows a vehicle speed to be controlled as per the braking request of the passenger even though the driver has applied the accelerator pedal. It will be appreciated that in an alternate example, the driving instructor may apply floor pedal 216 to request vehicle braking while the student driver applies brake pedal 208. Herein, in response to the received passenger braking request, the vehicle control system 220 may override the driver braking request. By enabling the accelerator pedal request of the driver to be selectively overridden, additional brake effort required to overcome the driver accelerator pedal input is reduced and a vehicle stopping time can be significantly lowered. This improves vehicle safety and reduces the likelihood of vehicle collisions that can arise due to a student driver's inexperience.

Figure 3:
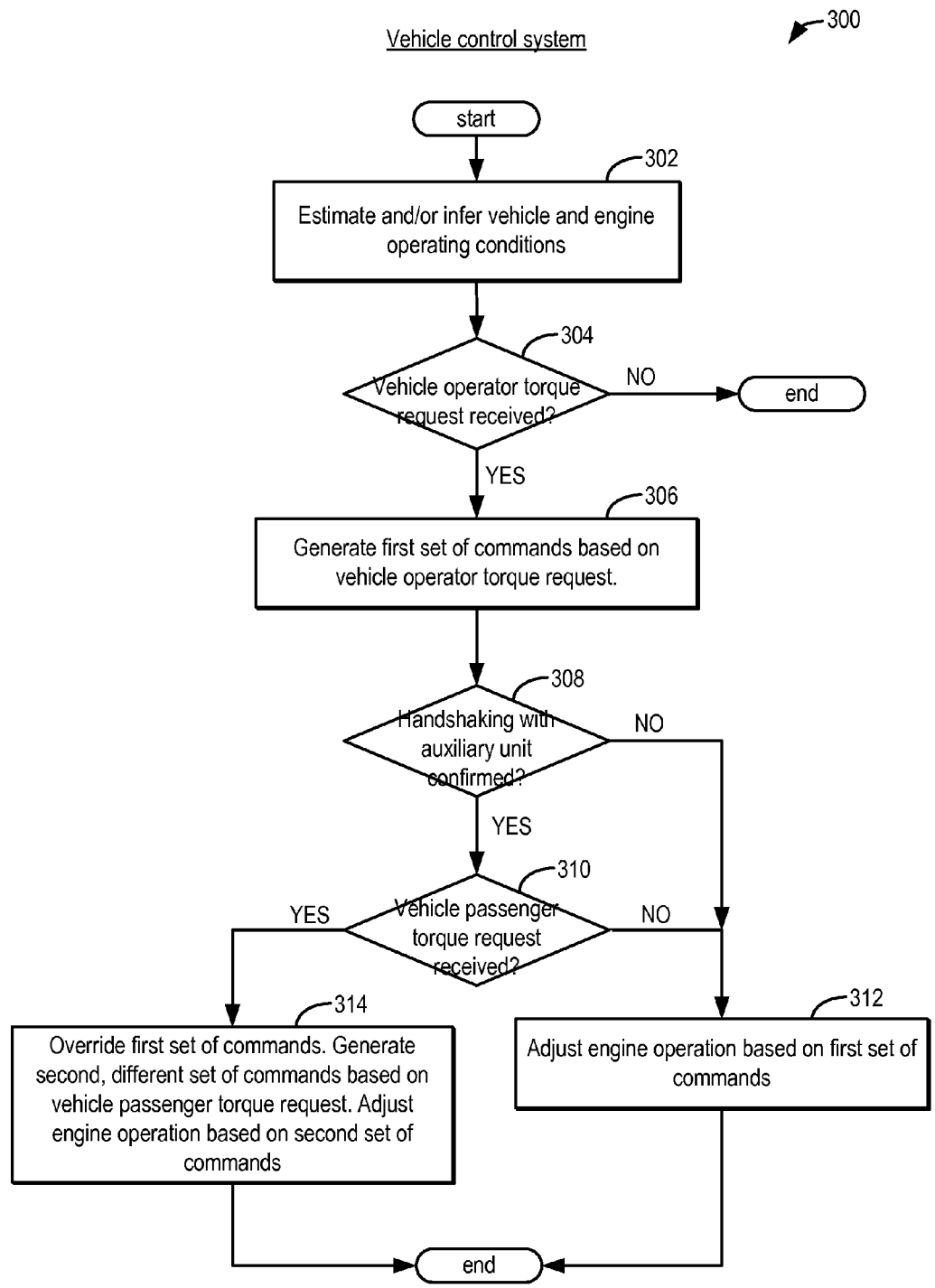
FIG. 3 shows a high level flow chart of a method for decelerating a driver training vehicle responsive to an operator torque request received via a vehicle pedal and a passenger torque request received via an auxiliary unit.

Now turning to FIG. 3, method 300 shows a routine for adjusting engine operation in a driver training vehicle based on torque requests received from a vehicle operator (e.g., a student driver) and/or a vehicle passenger (e.g., a driving instructor-passenger). As such, the method of FIG. 3 is performed by a control system of the vehicle (such as control system 12 of FIG. 1) and enables the driver training vehicle to be decelerated based on the torque requests.

At 302, the method includes estimating and/or inferring vehicle and engine operating conditions. The operating conditions may include, for example, vehicle speed, engine speed, manifold pressure (MAP), barometric pressure, exhaust catalyst temperature, engine temperature, pedal positions, ambient conditions (e.g., ambient temperature and humidity), a battery state of charge (if the vehicle is a hybrid vehicle), etc.

At 304, the method includes confirming if a vehicle operator torque request has been received. Herein, the vehicle operator may be a student driver who is learning how to drive. In one example, the vehicle operator, or driver, may provide a torque request by applying a brake pedal and/or an accelerator pedal of the vehicle. The control system may confirm that a driver torque request has been received in response to a pedal position of the brake pedal or the accelerator pedal being moved by a threshold distance.

As previously elaborated, the brake pedal and the accelerator pedal may be fixedly coupled in the vehicle cabin, particularly in a driver area of the cabin. In addition, the brake pedal in the driver area of the cabin may be coupled (e.g., mechanically coupled and/or electronically coupled) to a brake system of the vehicle. Further, in vehicles configured with a drive-by-wire (brake) system, the brake pedal may communicate with a brake control module of the vehicle control system. In response to a brake pedal input, the brake control module of the vehicle control system may adjust a wheel brake torque, an engine brake torque, a motor brake torque, etc., to provide the desired braking.

Upon confirming the vehicle operator torque request, at 306, the method includes generating a first set of commands responsive to the vehicle operator torque request. In particular, based on a torque request received via the driver area brake pedal and/or accelerator pedal, the control system may generate a first set of powertrain commands. In one example, where the torque request received is a (first) deceleration input, the vehicle control system may generate a first set of powertrain commands to provide an engine torque and a brake torque that can decelerate the vehicle.

Next, at 308, the method includes confirming handshaking with an auxiliary unit removably installed in the vehicle. As such, when the auxiliary unit is installed in the vehicle and handshaking has been confirmed, the auxiliary unit may be communicatively coupled to the vehicle control system, and electronically coupled to the vehicle's powertrain system (via the vehicle control system). For example, the auxiliary unit may include software logic, such as handshake logic, for enabling communication between a transducer of the auxiliary unit and the vehicle control system. The handshake logic allows a communication between the auxiliary unit and the vehicle control system to be properly established before data can be relayed from the auxiliary unit and received at the vehicle control system. In particular, the handshake logic may dynamically sets parameters of a communications channel established between the two heterogeneous entities (herein, the auxiliary unit and the vehicle control system) before normal communication over the channel begins. In this way, the handshake logic enables a connection between the auxiliary unit and the vehicle control system to be established before the data transfer (herein, transfer of a passenger torque request), and then following the data transfer, enables the connection to be terminated.

If handshaking with the auxiliary unit is not confirmed, then at 312, the method includes adjusting engine operation based on the generated first set of commands. Herein, the engine operation is adjusted to meet the driver's torque request. For example, the control system may provide an engine torque and brake torque based on the first set of powertrain commands to decelerate the vehicle at a first, slower rate. As such, when handshaking is not confirmed, the vehicle is essentially operated in a conventional or non-driver training vehicle mode wherein engine operations are adjusted responsive only to vehicle operator commands.

If handshaking with the auxiliary unit is confirmed, then at 310, the method includes confirming if a vehicle passenger torque request has been received. Herein, the vehicle passenger may be an instructor who is teaching the vehicle operator (herein, the student driver) how to drive. As such, when handshaking is confirmed, the vehicle is essentially operated in a driver training vehicle mode wherein engine operations are adjusted responsive to each of vehicle operator commands and vehicle passenger commands, with the lower requester being given a higher priority. The vehicle passenger torque request received may include a request for increased braking effort and/or reduced engine power. For example, the driving instructor may use request increased braking effort to bring the vehicle under control without the need for an appropriate response from an inexperienced driver-in-training.

The vehicle passenger may provide a torque request via one or more user input devices of the auxiliary unit, wherein the one or more user input devices are removably coupled in the vehicle cabin, particularly in a passenger area of the cabin. The one or more user input devices may include, as non-limiting examples, a pedal that is removably coupled to the floor of the cabin in the passenger area, a switch that is removably installable to a surface of the vehicle cabin, and/or a push-actuated button removably installable to a surface of the vehicle cabin, all within reach of the passenger's hand or feet. As such, the user input devices may not be mechanically or directly coupled to the brake system, clutch system, or accelerator system of the vehicle. Rather, the user input devices may be coupled to the various vehicle powertrain components indirectly, via the vehicle's control system (e.g., coupled to a diagnostics port of the vehicle). This allows a torque request received from the vehicle passenger to be met using the existing engine components and without requiring additional vehicle modifications. In particular, the passenger torque request can be met by providing an appropriate brake torque and engine torque using the vehicle's existing powertrain control modules.

If a vehicle passenger torque request is not confirmed, then the routine returns to 312 to adjust engine operation based on the generated first set of commands, that is, based only on the driver's torque request. However, if a vehicle passenger torque request is confirmed, then at 314, upon receiving the vehicle passenger request, the method includes generating a second, different set of commands based on the passenger request and overriding the first set of commands. The controller may then adjust engine operation based on the lower (in hierarchy) of the two sets of commands. For example, the torque request received from the passenger may be a (second) deceleration input and accordingly the vehicle control system may generate a second, different set of powertrain commands including an engine torque and a brake torque based on the second set of powertrain commands to decelerate the vehicle at a second, faster rate. As another example, in response to the vehicle passenger torque request, engine brake torque may be increased via increased engine compression braking.

It will be appreciated that while the depicted method illustrates receiving the second deceleration input from the vehicle passenger along with the first deceleration input from the vehicle operator and overriding the first set of commands responsive to the receiving of the second deceleration input from the vehicle passenger, in alternate embodiments, the second deceleration input may be received independent of the first deceleration input. As such, as long as handshaking with the auxiliary unit is confirmed, the vehicle control system may receive torque requests from the vehicle passenger even when no torque request is received from the vehicle operator. During such conditions, the vehicle control system may generate the second set of commands responsive to the vehicle passenger's torque request and adjust an engine torque and brake torque accordingly.

In still another embodiment, the second deceleration input from the passenger may be received while a first acceleration input is received from the vehicle operator. That is, the passenger may apply a removable floor pedal while the driver applies the accelerator pedal. During such conditions, the vehicle control system may generate the second set of commands responsive to the vehicle passenger's torque request while overriding the operator's acceleration input.

In embodiments where both the driver and the passenger provide deceleration inputs, each of the first and second set of commands generated responsive to the driver or passenger torque request may include one or more of a command for increased wheel braking torque, a command for increased motor braking torque, and a command for decreased engine torque. However, the first set of torque commands generated may decelerate the vehicle at a first, slower rate while the second set of torque commands generated may decelerate the vehicle at a second, faster rate. By decelerating the vehicle faster responsive to the vehicle passenger's brake torque request, while overriding the driver's brake torque request, the vehicle may be quickly decelerated by a driving instructor during conditions when the student driver is not able to brake the vehicle in a timely manner.

In embodiments where the driver provides an acceleration input and the passenger provides a deceleration input, the first set of commands may include one or more of a command for decreased wheel braking torque, a command for decreased motor braking torque, and a command for increased engine torque while the second set of commands may include increased wheel braking torque, increased motor braking torque, and/or decreased engine torque. Herein, the first set of torque commands generated may accelerate the vehicle while the second set of torque commands generated may decelerate the vehicle. By enabling the accelerator pedal request of the driver to be selectively overridden by the intervening passenger brake request, additional brake effort required to overcome the driver accelerator pedal input is reduced. This reduces the vehicle's stopping time as well as vehicle collisions that can arise due to the driver-in-training's lack of driving experience.

Figure 4:
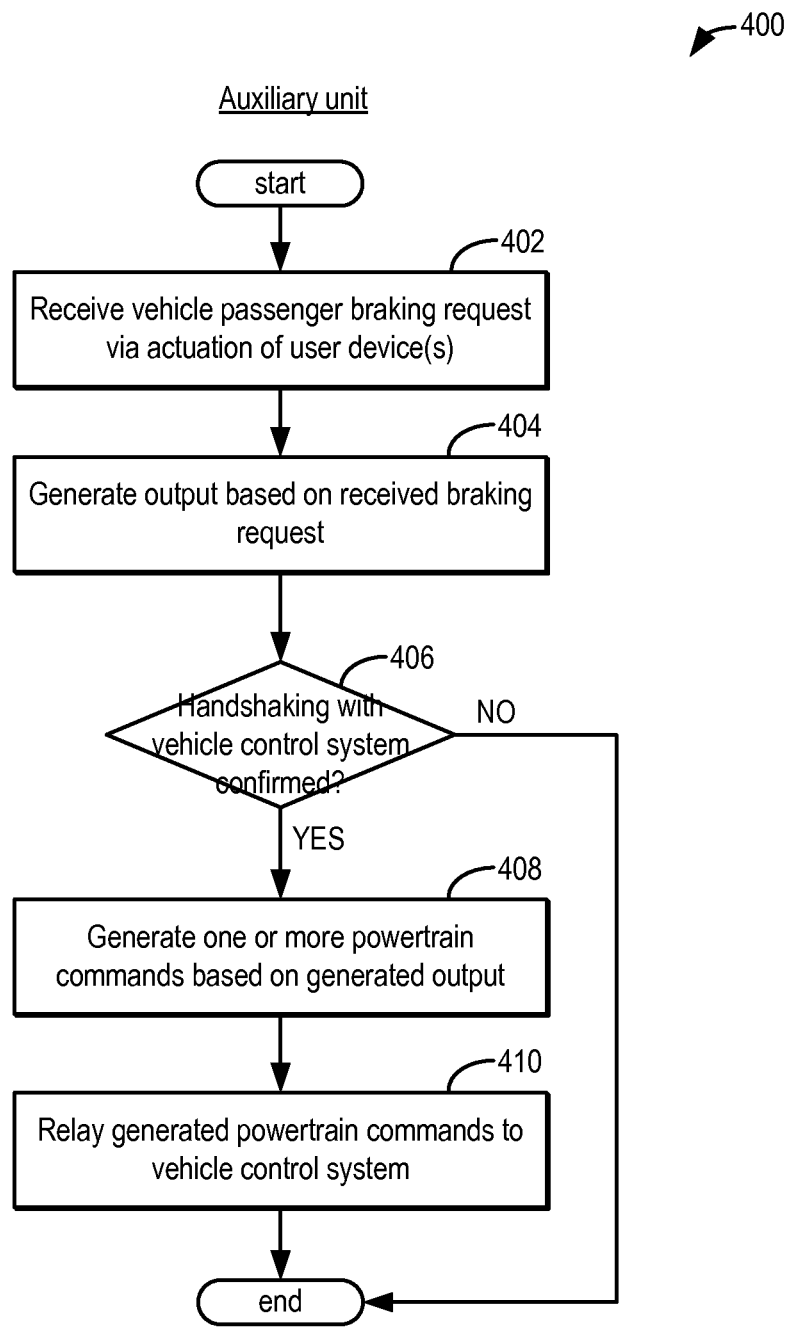
FIG. 4 shows a high level flow chart of a method for generating and relaying a passenger torque request from the auxiliary unit to a vehicle control system.
Figure 5:
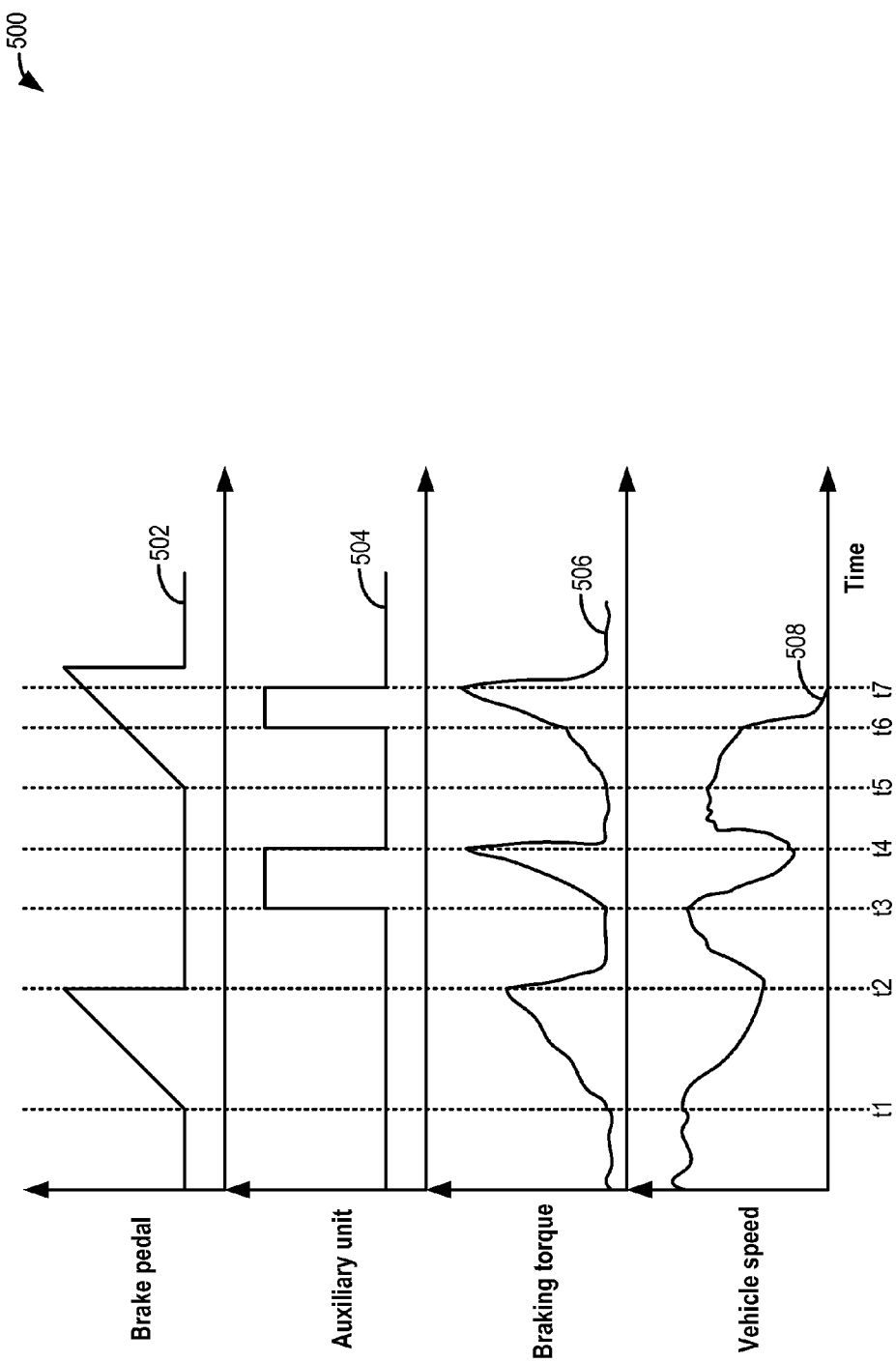
FIG. 5 shows example vehicle braking operations in a vehicle system according to the present disclosure.

Now turning to FIG. 4, method 400 shows a method for generating one or more powertrain commands based on a vehicle passenger torque request, and relaying the generated commands from a vehicle interface system, such as an auxiliary unit that is removably coupled in a driver training vehicle (such as auxiliary unit 103 of FIG. 1), to a control system of the vehicle. As such, the method of FIG. 4 is performed by the auxiliary unit and enables the vehicle to be decelerated based on the passenger's torque request.

At 402, the method includes receiving a passenger torque request. As such, the passenger torque request is received upon actuation of a user input device of the auxiliary unit. In one example, the passenger is a driving instructor and the passenger torque request received is a vehicle braking request. The braking request may be a request to decelerate the vehicle to a desired vehicle speed, or stop the vehicle substantially immediately (e.g., to prevent an imminent vehicle collision). As previously elaborated, the auxiliary unit may include one or more user input devices for receiving a braking request from the vehicle passenger and actuation of any one of the various user input devices may convey a passenger torque request. For example, the vehicle passenger may provide the braking request by actuating a pedal removably coupled to a floor of the vehicle via a fastener. As another example, the vehicle passenger may press a button (e.g., a panic button) that is removably coupled to a wall or dashboard of the vehicle via the fastener to provide the torque request. As yet another example, the vehicle passenger may flip a switch (e.g., an emergency switch) that is removably coupled to a wall of the vehicle via the fastener to provide the torque request. It will be appreciated that still other user input devices may be actuated. In further instances, the passenger may actuate multiple user input devices concomitantly. For example, the passenger may actuate the pedal while also pressing the panic button.

The auxiliary unit may include a transducer coupled to the user input device(s) that generates an output based on the braking request provided by the vehicle passenger via actuation of the user input device(s). In one example, the auxiliary unit may include a single transducer configured to receive braking requests from each of the user input devices. In alternate examples, each user input device may have a dedicated transducer for receiving a braking request from the corresponding user input device. Accordingly, at 402, the transducer(s) may receive an input indicative of the vehicle passenger braking request, the braking request based on the actuation of a user input device by the vehicle passenger.

At 404, the method includes generating an output based on the received braking request. Specifically, the transducer may generate an output based on the vehicle passenger braking request. The transducer output may be received by the auxiliary unit controller and used to generate and relay powertrain commands, as discussed below.

At 406, handshaking with the vehicle control system may be confirmed. As elaborated previously, the auxiliary unit controller may include handshake logic (that is, software logic) for establishing communication between the transducer and the vehicle control system before data is relayed from the auxiliary unit and received at the vehicle control system. In particular, the logic enables a safe and secure communicative connection between the auxiliary unit and the vehicle control system to be established before the passenger torque request and related data is transferred from the auxiliary unit. In some embodiments, the auxiliary unit may include a feedback indicator for indicating communicative coupling of the transducer with the vehicle control system based on successful handshaking between the controller and the vehicle control system. For example, if successful handshaking is confirmed, a feedback indicator light may be illuminated to indicate that communication between the auxiliary unit and the vehicle has been established and that data is being/can be transferred between the components. As such, if handshaking is not confirmed, the routine may end and no passenger braking request information may be relayed from the auxiliary unit to the vehicle control system.

At 408, upon confirming handshaking, the method includes generating one or more powertrain commands based on the braking request. Specifically, the controller of the auxiliary unit may receive the transducer output and generate one or more powertrain commands based on the transducer output. The one or more powertrain commands may include commands for engine torque and braking torque that enable the vehicle to be decelerated based on the passenger's brake request.

At 410, the controller may relay the one or more vehicle powertrain commands (generated at 408) to the vehicle control system. In one example, the controller of the auxiliary unit may be communicatively coupled to the vehicle control system via wireless communication and the one or more vehicle powertrain commands may be relayed over the wireless communication.

In one example, the auxiliary unit may include a first and a second user input device. The first user input device may be a pedal removably coupled to the floor of the vehicle cabin in the passenger area while the second user input device is a button (e.g., a push-actuated button) removably coupled to a dashboard of the vehicle cabin in the passenger area (as shown in the example embodiment of FIG. 2). Herein, in response to a first braking request received from the first input device, the controller may generate and relay a first powertrain command to the vehicle control system. In comparison, in response to a second braking request received from the second input device, the controller may generate and relay a second, different powertrain command to the vehicle control system. The first powertrain command generated responsive to actuation of the first user input device may provide deceleration of the vehicle at a first, slower rate while the second powertrain command generated responsive to actuation of the second user input device may provide deceleration of the vehicle at a second, faster rate. That is, if the vehicle passenger actuates either the floor pedal or the button, vehicle braking is requested however, actuation of the button indicates a request to decelerate the vehicle faster than with actuation of the pedal, and accordingly a powertrain command reflective of a larger braking torque may be generated. For example, actuation of the button (e.g., a panic button) may indicate a request for maximum braking torque and minimum engine torque so as to stop the vehicle substantially immediately.

In an alternate example, a first powertrain command may be generated responsive to actuation of any one of the multiple user input devices to enable deceleration of the vehicle at a first, slower rate while a second, different powertrain command may be generated responsive to actuation of multiple (e.g., two or more) user input devices to enable deceleration of the vehicle at a second, faster rate. Herein, if the vehicle passenger actuates either the floor pedal or the button, vehicle braking is requested however, actuation of both the pedal and the button indicates a request to decelerate the vehicle faster than with actuation of either the pedal or the button. Accordingly, when both the pedal and the button are actuated, a powertrain command reflective of a larger braking torque may be generated.

In this way, a braking request provided by a vehicle passenger can be relayed to a vehicle control system of a driver training vehicle to expedite vehicle deceleration. This allows a driving instructor to bring the vehicle under control without the need for an appropriate response from an inexperienced student driver. Likewise, the driving instructor can bring the vehicle under control even if the inexperienced student driver does not perform the appropriate response. For example, the driving instructor can decelerate the vehicle to control vehicle speed if the student driver has (erroneously) applied the accelerator pedal or if the student driver is not able to apply the brake pedal of the vehicle in a timely manner to avoid a collision.

In one example, a vehicle system is provided including a vehicle and an auxiliary unit. The vehicle includes a first floor pedal fixedly installed in a cabin in a driver area while the auxiliary unit includes a second floor pedal removably installed in the cabin in a passenger area. The vehicle system further includes a control system configured with computer readable instructions that enable an engine torque output and brake output to be adjusted responsive to the operation of the first and second pedals. The control system may receive a first deceleration input from a vehicle operator via the first pedal and adjust the engine torque output and brake output responsive to the first deceleration input to decelerate the vehicle.

The control system may receive a second deceleration input from a vehicle passenger via the second pedal. The auxiliary unit may include a transducer that is communicatively coupled to the second pedal, the auxiliary unit further being communicatively coupled to the vehicle control system via the transducer. For example, the vehicle control system may receive a braking command relayed from the transducer, wherein the braking command is generated by the transducer based on the second deceleration input of the second pedal. The second deceleration input from the vehicle passenger may be received along with the first deceleration input, or independent of it. Upon receipt, the control system may adjust the engine torque output and brake output responsive to the second deceleration input while overriding the first deceleration input (if a first deceleration input was received). The engine torque output and brake output generated responsive to the second deceleration input may decelerate the vehicle faster than the engine torque output and brake output responsive to the first deceleration input.

In a further example, the vehicle may further include a diagnostic port inside the vehicle cabin and the auxiliary unit may further includes a user input button that is removably installable on the diagnostic port. Herein, the user input button (or alternate user input device) may be electronically coupled to the brake system of the vehicle via the control system. The control system may receive a third deceleration input from the vehicle passenger via the user input button. The third deceleration input may be received along with, or in place of, the second deceleration input. That is, the operator may have actuated each of the (second) pedal and the button, or actuated only the button. Accordingly, the vehicle control system may adjust the engine torque output and brake output responsive to the (second and) third deceleration input while overriding the first deceleration input. Herein, the engine torque output and brake output responsive to the third deceleration input decelerates the vehicle faster than the engine torque output and brake output responsive to each of the first and second deceleration inputs. In this way, by overriding the operator's brake pedal request, the passenger may rapidly control the vehicle and prevent an imminent vehicle collision.

In yet another example, the control system may receive a first acceleration input from the vehicle operator via the first pedal and adjust the engine torque output and brake output responsive to the first acceleration input to accelerate the vehicle. The control system may receive a second deceleration input from the vehicle passenger via the second pedal. The second deceleration input from the vehicle passenger may be received along with the first acceleration input. Upon receipt, the control system may adjust the engine torque output and brake output responsive to the second deceleration input while overriding the first acceleration input. The engine torque output and brake output generated responsive to the second deceleration input may decelerate the vehicle. By overriding the operator's accelerator pedal input, a braking effort required to overcome the acceleration input of the operator is reduced, and the vehicle can be rapidly stopped by the passenger to prevent an imminent collision.

Now turning to FIG. 5, map 500 shows example brake torque applications in a driver training vehicle responsive to a braking request received from either a vehicle operator (such as a student driver) or a vehicle passenger (such as a instructor passenger). Map 500 depicts actuation of a vehicle brake pedal by the vehicle operator at plot 502. Actuation of a user input device of an auxiliary unit by the vehicle passenger is shown at plot 504. The resulting braking torques applied by a vehicle control system on the vehicle is shown at plot 506. Corresponding changes in the vehicle speed are shown at plot 508. All changes are shown over time (along the x-axis).

Prior to t1, the vehicle may be running with no braking requested by either the vehicle operator or the vehicle passenger. At t1, a first driver deceleration input is received from the vehicle operator via a first floor pedal (e.g., a brake pedal) fixedly installed in a driver area of the vehicle cabin (plot 502). The first pedal may be mechanically coupled to a brake system of the vehicle. In response to the first driver deceleration input received via the first floor pedal, a vehicle control system may adjust an engine torque output and brake torque output (plot 506) so as to decelerate the vehicle (plot 508) at a first rate (as determined by a slope of plot 508 between t1 and t2). At t2, the vehicle operator may release the first floor pedal and the vehicle speed may start to rise again.

At t3, a first passenger deceleration input is received from the vehicle passenger via a second floor pedal (e.g., a brake pedal) of an auxiliary unit installed in the vehicle (plot 504). The second floor pedal may be removably installed in a passenger area of the vehicle cabin and may be electronically coupled to the brake system of the vehicle via the vehicle control system. In response to the first passenger deceleration input received via the second floor pedal, the vehicle control system may adjust an engine torque output and brake torque output (plot 506) so as to decelerate the vehicle (plot 508) at a second rate (as determined by a slope of plot 508 between t3 and t4). At t4, the vehicle passenger may release the second floor pedal and the vehicle speed may start to rise again. As can be seen upon comparing plots 506 and 508 at t1-t2 with the plots at t3-t4, the engine torque output and brake output generated responsive to the first passenger deceleration input is larger and decelerates the vehicle faster than the engine torque output and brake output generated responsive to the first driver deceleration input.

At t5, a second driver deceleration input is received from vehicle operator via the first floor pedal (plot 502). Consequently, the vehicle control system adjusts a brake torque output (plot 506) responsive to the second driver deceleration input to decelerate the vehicle (plot 508). While the vehicle is being controlled responsive to the second driver deceleration input, a second passenger deceleration input is received at t6. Consequently, at t6, the vehicle control system may override the second driver deceleration input and further adjust a brake torque output (plot 506) responsive to the second passenger deceleration input to decelerate the vehicle (plot 508) at a higher rate. In particular, as can be seen by comparing plots 506 and 508 at t5-t6 with the plots at t6-t7, the applied brake torque may be increased responsive to the second passenger deceleration input to decelerate the vehicle faster and bring the vehicle to a stop substantially earlier than would have been possible responsive to the second driver deceleration input.

It will be appreciated that while the above example depicts the passenger input device as an on/off device, this is not meant to be limiting. In alternate embodiments, a passenger may modulate the amount of braking torque requested via the pedal such that a full stomp or depression of the pedal to the floor or the actuation of a panic button/switch input would result in maximum deceleration.

In this way, existing vehicle drive-by-wire systems for braking and accelerating a vehicle can be advantageously leveraged to meet a vehicle passenger's torque request in a driver training vehicle. By using a portable auxiliary unit communicatively coupled with the vehicle's engine and brake control modules, any vehicle can be used as an educational vehicle without requiring substantial and expensive modifications to the vehicle. By enabling a student driver's accelerator pedal input as well as brake pedal input to be overridden by an instructor passenger's brake torque request, vehicle stopping times can be reduced, improving vehicle safety. Overall, the safety, cost, and portability of a driving vehicle can improved.

As will be appreciated by one of ordinary skill in the art, routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

The invention claimed is:

1. A vehicle interface system of a vehicle, comprising:
a user input device for receiving a passenger braking request from a passenger, the user input device distinct from each of a brake pedal and an accelerator pedal fixedly installed in a vehicle cabin;
a transducer coupled to the user input device for generating an output based on the braking request; and
a controller with software logic for,
receiving the transducer output;
generating each of an engine brake torque command and a wheel brake torque output command based on the passenger braking request, the engine brake torque command including an engine compression braking and an engine regenerative braking command, the engine brake torque command generated independent of an operator braking request received via the brake pedal and an operator acceleration request received via the accelerator pedal, wherein the operator braking request and the operator acceleration request is received along with the passenger braking request, and wherein the generating includes overriding the operator braking request and the operator acceleration request; and relaying the engine brake torque command and the wheel brake torque output command to a vehicle control system via a vehicle diagnostics port, the port also relaying diagnostic codes related to vehicle malfunction.

2. The interface system of claim 1, wherein the software logic includes handshake logic for communication between the transducer and the vehicle control system and wherein the commanded engine brake torque and wheel brake torque output enables the vehicle to be decelerated by the vehicle control system based on the passenger braking request.

3. The interface system of claim 2, further comprising a feedback indicator for indicating communicative coupling of the transducer with the vehicle control system based on successful handshaking between the controller and the vehicle control system.

4. The interface system of claim 1, further comprising a fastener, wherein the user input device includes a pedal which is removably couplable to a floor of the vehicle via the fastener, wherein the user input device, when installed, is not mechanically coupled to a brake system, clutch system, and/or accelerator system of the vehicle, and wherein the interface system, when installed, is electronically coupled to a powertrain system of the vehicle.

5. The interface system of claim 1, further comprising a fastener, wherein the user input device includes a push-actuated button or switch which is removably couplable to a surface in the vehicle cabin, within reach of the passenger, via the fastener, and wherein the user input device is not mechanically coupled to a brake system, clutch system, and/or accelerator system of the vehicle.

6. The interface system of claim 1, wherein the user input device is a first user input device, and wherein the interface system further includes a second user input device, each of the first and second user input devices electronically coupled to the vehicle control system via the controller.

7. The interface system of claim 6, wherein the first or second user input device includes one of a pedal that is removably couplable to a floor of the vehicle cabin and a push-actuated button or switch that is removably installable to a surface of a vehicle cabin within reach of the passenger.

8. The interface system of claim 7, wherein the controller generating an engine brake torque and wheel brake torque output command based on the braking request includes,
in response to a first braking request received from the first user input device, generating and relaying a first wheel brake torque command to the vehicle control system; and
in response to a second braking request received from the second user input device, generating and relaying a second engine brake torque command to the vehicle control system, the second engine brake torque command including increased engine compression braking, increased engine regenerative braking, and increased engine brake torque via adjustment of engine powertrain components.

9. A driver training vehicle system, comprising:
a cabin of a vehicle;
a powertrain system including an engine and a transmission;
a brake system including wheel brakes for braking vehicle wheels;
a brake pedal for receiving a brake request from a vehicle operator, the brake pedal mechanically coupled to the brake system;
an accelerator system including an accelerator pedal for receiving an acceleration request from the vehicle operator, the accelerator pedal coupled to the powertrain system;
a diagnostics port inside the vehicle cabin, the diagnostics port configured to receive a brake request from a vehicle passenger via an auxiliary unit removably couplable to the diagnostics port, the auxiliary unit not mechanically coupled to the brake system; and
a control system with computer readable instructions for,
generating a first set of commands responsive to the vehicle operator brake request or the vehicle operator acceleration request and adjusting a wheel brake torque based on the first set of commands; and
upon receiving the vehicle passenger brake request via the diagnostics port along with the vehicle operator brake request or acceleration request,
generating a second, different set of commands based on the passenger brake request;
overriding the first set of commands; and
based on the second set of commands, increasing engine compression braking, increasing engine regenerative braking, and adjusting engine operation to decrease an engine power, and increase an engine braking torque.

10. The vehicle system of claim 9, wherein when the first set of commands is generated responsive to the vehicle operator brake request, the first set of commands decelerates the vehicle at a first, slower rate and wherein the second set of commands decelerates the vehicle at a second, faster rate.

11. The vehicle system of claim 10, wherein when the first set of commands is generated responsive to the vehicle operator brake request, the wheel brake torque is increased based on the first set of commands, and wherein the first and second sets of commands further include a command for increased motor braking torque.

12. The vehicle system of claim 11, wherein the vehicle is a driver training vehicle.

13. The vehicle system of claim 12, wherein the brake pedal is fixedly installed in a driver area of the cabin, and wherein the diagnostics port is configured to receive the vehicle passenger brake request via a portable pedal of the auxiliary unit, the portable pedal removably installable in a passenger area of the cabin.

14. The vehicle system of claim 13, wherein the accelerator pedal is fixedly installed in the driver area of the cabin, wherein the brake pedal and accelerator pedal are mechanically coupled to the powertrain system of the vehicle, and wherein the auxiliary unit, when installed, is electronically coupled to the powertrain system of the vehicle via the diagnostics port.

15. A driver assistance interface system, comprising:
a vehicle including a first floor pedal fixedly installed in a cabin in a driver area, the first floor pedal mechanically coupled to a brake system;
an auxiliary unit including a second floor pedal removably installed in the cabin in a passenger area, the second floor pedal electronically coupled to the brake system and a powertrain system of the vehicle; and
a control system with computer readable instructions for,
receiving a first acceleration input from a vehicle driver via the first pedal while receiving a second deceleration input from a vehicle passenger via the second pedal; and
responsive to the second deceleration input, overriding the first acceleration input by increasing a wheel brake torque, an engine brake torque, engine compression braking, and engine regenerative braking to decelerate the vehicle.

16. The system of claim 15, wherein the auxiliary unit further includes a transducer communicatively coupled to the second pedal, the auxiliary unit communicatively coupled to the control system via the transducer, and wherein the control system receiving a second deceleration input from a vehicle passenger via the second pedal includes the control system receiving a braking command relayed from the transducer, the braking command generated by the transducer based on the second deceleration input of the second pedal, independent of the first acceleration input of the first pedal.

17. The system of claim 16, wherein the vehicle further includes a diagnostics port inside the vehicle cabin and wherein the auxiliary unit further includes a user input device removably installable on the diagnostics port, the user input device electronically coupled to the brake system of the vehicle via the control system, and wherein the control system includes further instructions for, receiving a third deceleration input from the vehicle passenger via the user input device; and responsive to the third deceleration input, increasing each of the wheel brake torque, the engine brake torque, the engine compression braking, and the engine regenerative braking while overriding the first acceleration input, wherein the increasing responsive to the third deceleration input decelerates the vehicle faster than the increasing responsive to the second deceleration input.

\* \* \* \* \*